United States Patent [19]
DeLord

[11] Patent Number: 4,641,684
[45] Date of Patent: Feb. 10, 1987

[54] RAIL FOR AN AIR TURNING VANE ASSEMBLY

[76] Inventor: Ernest P. DeLord, 200 Pine St., Prospect Heights, Ill. 60070

[21] Appl. No.: 823,012

[22] Filed: Jan. 27, 1986

Related U.S. Application Data

[62] Division of Ser. No. 610,630, May 15, 1984, Pat. No. 4,586,540.

[51] Int. Cl.$^4$ .............................................. B21D 39/00
[52] U.S. Cl. ................................... 137/561 A; 138/37; 138/39; 29/283.5; 29/513
[58] Field of Search ..................... 138/39, 37; 248/247, 248/248; 72/186; 29/283.5, 243.5, 513; 137/561 A; 428/597

[56] References Cited

U.S. PATENT DOCUMENTS

| | | | |
|---|---|---|---|
| 2,861,597 | 11/1958 | Gracer | 138/39 |
| 2,959,195 | 11/1960 | Gracer | 138/39 |
| 3,405,737 | 10/1968 | Harper | 138/39 |
| 3,427,847 | 2/1969 | Harper | 72/186 |
| 4,467,829 | 8/1984 | DeLord | 138/39 |

OTHER PUBLICATIONS

"Snips Magazine", vol. 50, No. 11, Jan. 1982, p. 25. Durodyne Durovane Rail Advertisement.

Primary Examiner—Robert C. Watson
Attorney, Agent, or Firm—Robert V. Jambor

[57] ABSTRACT

An air turning vane assembly in which the vanes are attached to rail tabs by integral locking clips formed upon the rail tabs. The rail assembly is constructed from nestable rails having cutout portions to receive the tabs of similar rails to permit compact nesting. A locking tool has a cutting tooth which cuts a ribbon in a vane wall to form an integral locking clip for securing the vanes to the rails.

3 Claims, 9 Drawing Figures

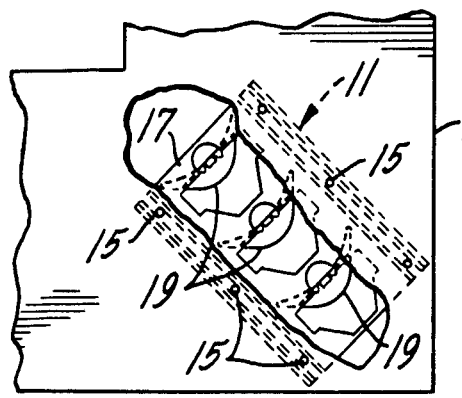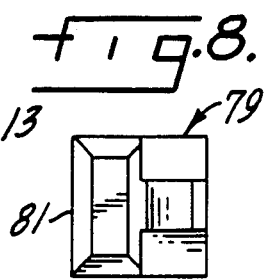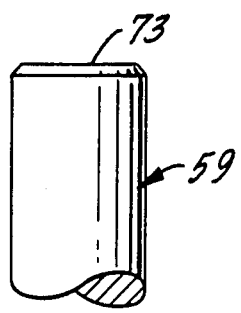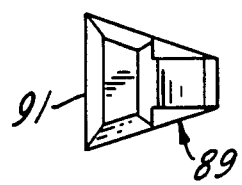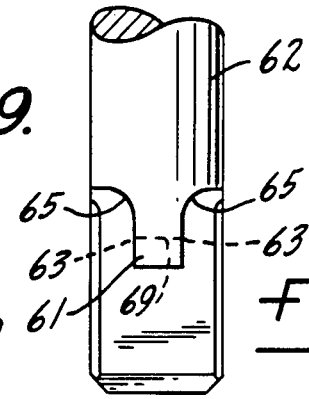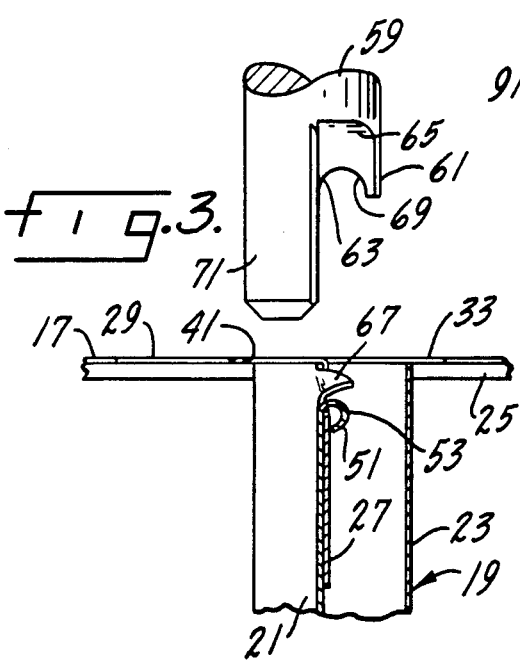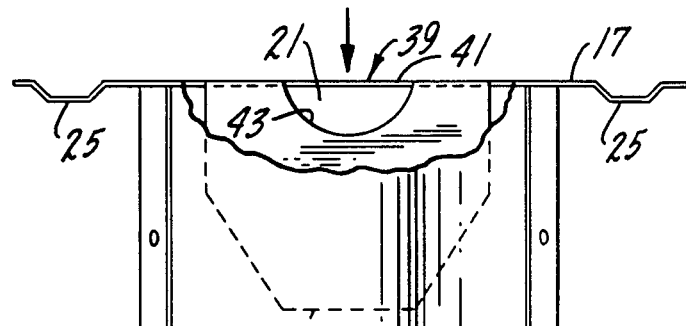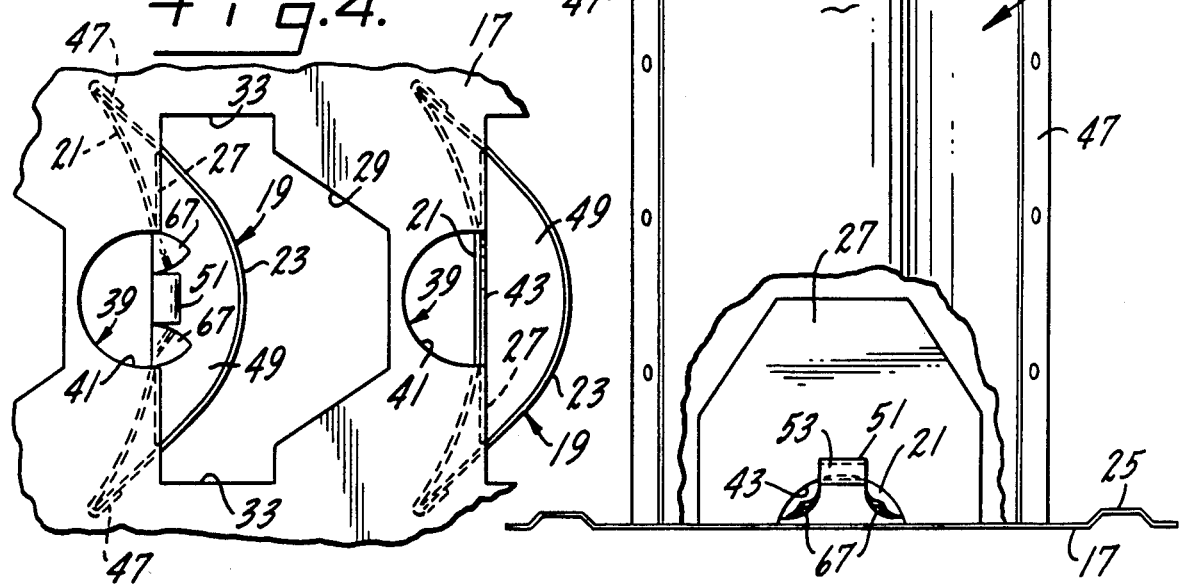

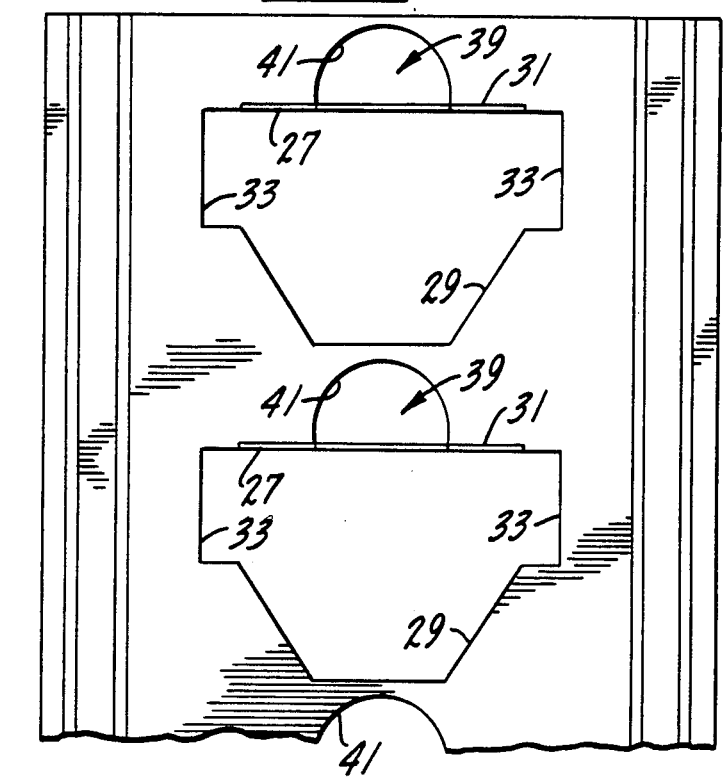
fig.5.
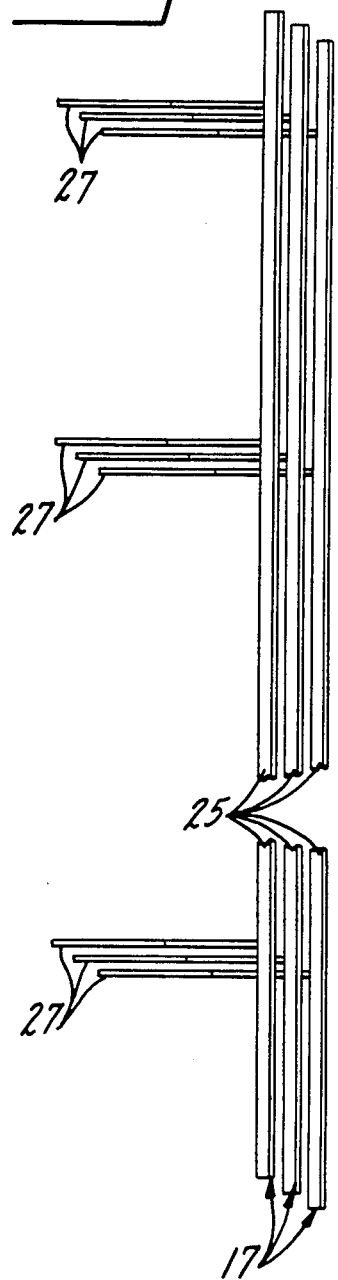
fig.7.
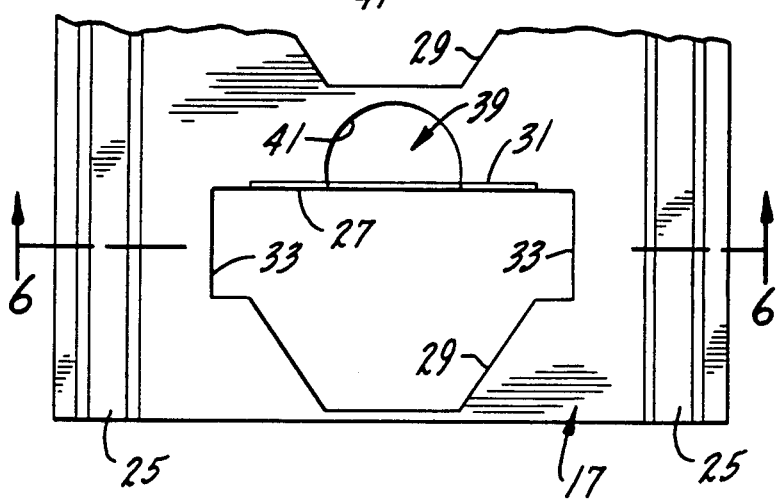
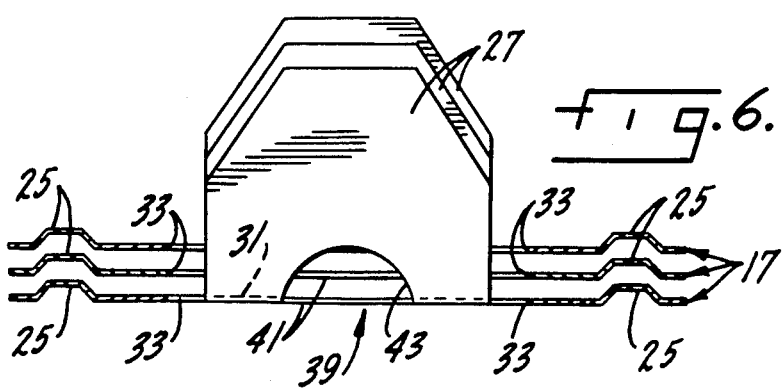
fig.6.

RAIL FOR AN AIR TURNING VANE ASSEMBLY

This is a division of application Ser. No. 610,630, filed May 15, 1984 now U.S. Pat. No. 4,586,540.

BACKGROUND OF THE INVENTION

This invention is directed to an air turning vane assembly of the type which is installed in an air duct and a method of fastening the vanes to such an assembly. It is particularly concerned with an air turning vane assembly which can be assembled in a sheet metal shop quickly by a workman using relatively simple tools.

Air turning assemblies are installed in sheet metal duct work at turns, especially right angle turns, to reduce friction loss. Since such air turning vane assemblies must fit a particular size duct, they are usually assembled at a sheet metal shop from prefabricated rails and vanes. Thus, each air vane assembly is made up of a large number of parts which have to be fastened together by a workman using dowels, screws or nails. Air turning vanes constructed in this manner are liable to work loose and to rattle after they are installed. Also, such construction is extremely labor intensive, expensive and unsatisfactory.

One attempt to solve this problem was to form slotted dimples in the rails and insert the vanes in the slots of the dimples, then flatten the protruding portions of the vanes that extend through the dimples with a hammer or twisting tool. An assembly of this type is expensive and labor intensive because it requires a careful alignment of the vanes with the slots and dimples formed in the rails and requires the bending of at least two dimples per vane at each rail to fasten the vane to the rail.

An alternate form of construction of an air turning vane assembly utilizes tabs formed in the rails which engage the vanes. Notches are formed in the rail and in the tabs adjacent each vane to provide an opening for a hammer which can be used to bend a portion of the vane over the tab into the notch to secure the vanes to the side rails. In this prior construction, the uniformity of the connection depends to a great degree on the skill of the workman being able to bend the portion of the vane over the tab without damaging the remaining portions of the side rails.

The present invention is directed to an air turning vane assembly which can be assembled by a workman using relatively simple tools to provide a uniformly effective fastening connection each time between a vane and rail.

SUMMARY OF THE INVENTION

The present invention encompasses an air turning vane assembly which is rigid and rattle-free and which can be rapidly assembled by a workman using simple tools. It also provides economy of shipment since the rails readily stack and nest compactly relative to one another so that they can be properly assembled at the shop and economically transported to the installation site.

DESCRIPTION OF THE DRAWINGS

FIG. 1 is a top plan view showing an air turning vane assembly of this invention installed in the right angle turn of a duct with a portion of the top wall of the duct broken away.

FIG. 2 is a front elevational view showing a locking tool of this invention prior to engaging a vane and a rail tab to fasten a vane to a rail of a partially assembled air turning vane assembly.

FIG. 3 is a partial side elevational view with portions in section of the tool of FIG. 2 showing the vane and rail after they have been locked together by the tool.

FIG. 4 is a partial top plan view of an air turning vane assembly of this invention showing one vane locked to the rail and another prior to being locked to the rail.

FIG. 5 is a top plan view of a rail of this invention broken longitudinally for compactness of illustration.

FIG. 6 is a cross-sectional view taken along line 6—6 of FIG. 5 showing a number of rails stacked and nested relative to one another but slightly separated for clarity of illustration.

FIG. 7 is a side elevational view of the nested rails of FIG. 6 shown slightly separated for clarity of illustration.

FIG. 8 is an end view of a modified form of locking tool.

FIG. 9 is an end view of yet another modified form of locking tool.

DETAILED DESCRIPTION

Referring now to the drawings, FIG. 1 shows an air turning vane assembly 11 of this invention installed in a right angle turn of a sheet metal duct 13 with a portion of the top wall of the duct removed for clarity of illustration. Air turning vane assemblies of this type are installed in such ducts to reduce the friction loss of air flow at right angle turns.

The vane assembly is attached to the duct by nails or screws 15 which extend through the vane assembly and into the sheet metal walls of the duct. As is conventional, the air turning vane assembly 11 includes a pair of elongated generally planar rectangular sheet metal side rails 17 which are mounted on the opposite ends of a plurality of sheet metal air turning vanes 19 spaced along the lengths of the rails. The vanes may be made of a single curvilinear piece of metal, called a single vane or may be made of a pair of bent sheets of metal 21 and 23, as shown most clearly in FIG. 4 of the drawings, to form what is called a hollow vane.

The rails 17 are formed from long strips of galvanized sheet metal cut to a desired length. The side rails are generally planar in cross-section having embossed channels 25 extending along their lengths on opposite sides thereof for strength and rigidity.

It is also conventional, as shown most clearly in FIGS. 2 and 5-7 of the drawings, to form a plurality of upstanding tabs 27 along the length of each rail with each tab formed by a partially cutout portion 29 of the rail which is bent along a foldline 31 to extend generally at right angles to the planar portion of the rail 17.

In accordance with this invention, a generally rectangular portion 33 is cut out of each rail on each side of the tab cutout 29 to create a lateral enlargement of the cutout. The tab cutout thereby provides clearance for the upstanding tabs 27 of other rails when one rail is nested upon the other in the manner shown in FIGS. 6 and 7 of the drawings. The length of the cutout portion 33 along the longitudinal extent of the rail can be varied and will depend upon the number of side rails that will be nested at any one time.

Also in accordance with this invention, a tool cutout 39 is formed in the rail at each tab 27. Usually the tool cutout 39, the tab 27 which partially defines cutout 29, and the lateral enlargement portions 33 are formed simultaneously, although they can be formed individually.

The tool cutout 39 in this embodiment is circular and extends across the foldline 31 of the rail into the base of the tab 27, thereby forming a semi-circular cutout portion 41 in the planar portion of the rail and a smaller semi-circular cutout portion 43 in the base of the tab, which are most clearly shown in FIGS. 2 and 6 of the drawings.

In this embodiment of the invention, the vanes 19 are hollow, each having a downstream wall 21 and an upstream wall 23 with the wall 23 having a more pronounced curvature. The edges of the wall 21 are bent around the edges of the wall 23 and are crimped to form seams 47. This type of hollow vane provides an enclosed space 49 which is open at its ends.

In assembling the air turning vane assembly, the vanes 19 are positioned adjacent the upstanding tabs 27 of the rail 17 so that each tab is disposed adjacent the inside surface of a downstream wall 21 of a vane in the manner shown most clearly in FIGS. 2, 3 and 4 of the drawings. The semi-circular cutout portions 41 and 43 of the tool cutout 39 provide access to both sides of an end portion of the wall 21 of the vane 19 located adjacent a tab for attachment purposes. The vane is locked to its adjacent tab by forming an integral ribbon 51 in the wall 21 of the vane in the end portion thereof made accessible by the semi-circular portion 43 of the tool cutout 39 and rolling this ribbon into a curved clip 53 which bears against the tab in the manner most clearly shown in FIGS. 2, 3 and 4 of the drawings.

The securing or locking of a vane wall 21 to a tab 27 of the rail is accomplished by a locking tool such as tool 59 shown in FIGS. 2 and 3 of the drawings. The locking tool 59 has a cutting tooth 61 located at one end of its cylindrical body 62. The cutting tooth 61 has side cutting edges 63 which define the width of the ribbon 51 and curved cutting edges 65 which form bent over tabs 67 on opposite sides of the ribbon. Located inwardly of the cutting tooth 61 is a curved forming surface 69 that rolls the ribbon 51 into the locking clip 53. The locking tool 59 is also formed with a guide and alignment surface 71, which in this embodiment is circular, to engage the semi-circular portion 41 of the tool cutout 39 when the tool is inserted in the tool cutout 39 of the rail in the manner indicated in FIGS. 2 and 3 of the drawings.

In use, the locking tool 59 is inserted into the tool cutout 39 in the rail. The impact surface 73 of the locking tool is struck with a hammer or mallet to drive the cutting edges 63 of the cutting tooth through the end of the wall 21 of the vane, thereby cutting a ribbon 51 of metal. As the ribbon is cut, it engages the forming surface 69 of the tool, curving the ribbon into a locking clip 53. The depth of the cut made by the cutting tooth is limited by engagement of the curved cutting edges 65, which are located at the base of the cutting tooth 61, with the end of the vane wall 21, thereby forming the bent tabs 67 which increase resistance to cutting movement of the locking tool 59.

A modified form of locking tool 79 is shown in FIG. 8 of the drawings. This tool is similar to the locking tool 59 differing only in that it has a body of rectangular cross-section. Therefore, its guiding surface 81 is also rectangular. This tool is adapted to be inserted into a tool cutout opening of square or rectangular cross section.

The locking tool 89 shown in FIG. 9 of the drawings is similar in construction to the locking tool 59 except that the cross-section of its body is trapezoidal and is intended for use in a tool cutout opening of similar trapezoidal shape. It has a guiding surface 91 intended to fit in a similarly shaped portion of the tool cutout opening.

It will be apparent to those skilled in the art that various additions, substitutions, modifications and omissions may be made to the construction of the present invention without departing from the scope or spirit of the invention. Thus, it is intended that the present invention cover the additions, substitutions, modifications and omissions of this invention which come within the permissible scope of the appended claims.

I claim:

1. A rail for an air turning vane assembly, said rail being formed of an elongated generally planar sheet of sheet metal, and
   a plurality of upstanding tabs located along the length of the rail with each tab formed by a partially cutout portion of the rail, each partially cutout portion being defined by a cut in the rail in the general shape of the tab with one side remaining uncut, each tab being bent along a fold line defined by said uncut side so that the tab extends generally at right angles to the plane of the rail,
   said rail defining a cutout portion defining an enlargement at each side of each tab cutout so that the combined width of the tab cutout and the cutout portions on each side of the tab cutout is greater than the width of the tab.

2. The rail of claim 1 in which a tool receiving cutout is formed in the rail adjacent each tab.

3. The rail of claim 1 in which a tool cutout is formed in the rail adjacent each tab with each tool cutout extending across the fold line of its tab and through its tab.

* * * * *